United States Patent
Kappel

(10) Patent No.: US 7,133,803 B2
(45) Date of Patent: Nov. 7, 2006

(54) CNC PRODUCTION SYSTEM WITH CENTRAL DATABASE AND A WORKPIECE MEASURING METHOD

(75) Inventor: Robert Kappel, Bräunisheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/949,985

(22) Filed: Sep. 24, 2004

(65) Prior Publication Data

US 2005/0071121 A1 Mar. 31, 2005

(30) Foreign Application Priority Data

Sep. 25, 2003 (DE) ................ 103 44 418

(51) Int. Cl.
*G01B 5/00* (2006.01)
(52) U.S. Cl. ...................................... 702/155
(58) Field of Classification Search ................ 702/155
See application file for complete search history.

(56) References Cited

U.S. PATENT DOCUMENTS

| | | | |
|---|---|---|---|
| 4,901,218 A | 2/1990 | Cornwell | |
| 5,198,990 A | 3/1993 | Farzan et al. | |
| 6,611,786 B1 * | 8/2003 | Zhang et al. | 702/156 |
| 2003/0125901 A1 * | 7/2003 | Steffey et al. | 702/155 |
| 2004/0107073 A1 * | 6/2004 | Sakurada et al. | 702/167 |
| 2004/0109205 A1 * | 6/2004 | Asano et al. | 358/448 |
| 2005/0086025 A1 * | 4/2005 | Nomura et al. | 702/167 |
| 2006/0047457 A1 * | 3/2006 | Agapiou et al. | 702/94 |

* cited by examiner

*Primary Examiner*—Michael Nghiem
*Assistant Examiner*—Cindy D. Khuu
(74) *Attorney, Agent, or Firm*—Laurence A. Greenberg; Werner H. Stemer; Ralph E. Locher

(57) ABSTRACT

A system for a computer-controlled measurement of workpieces has at least one measuring machine and a device for entering dimensions of workpieces to be produced as parameters into a database. The system is distinguished in that the measuring strategy of a measuring program can be generated by a computer in dependence on the parameters to be read in from the database and the generated measuring program is converted into a machine-dependent control program of the measuring machine.

10 Claims, 3 Drawing Sheets

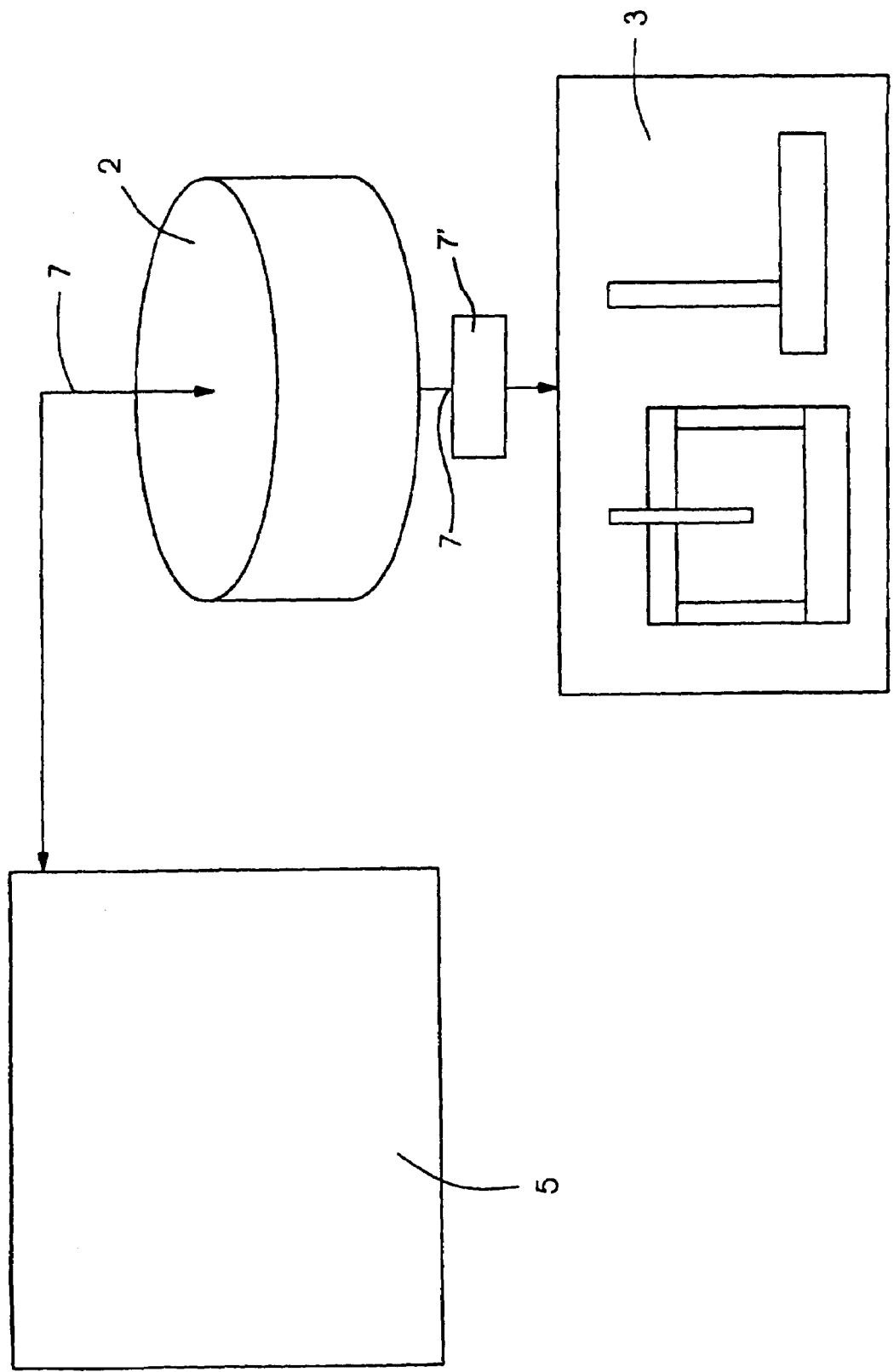

Thread Position

| | |
|---|---|
| Feature Number | 108_G04 |

| | | Feeler Pin No. | 3 |
|---|---|---|---|
| Measuring Module Name | THREAD_POSI | Cutting Height | -680.000 |
| Level Code Number | 1 | X - OT / UT | 0.000 | 0.000 |
| X Coordinate | 3.000 | Y - OT / UT | 0.200 | -0.200 |
| Y Coordinate | -69.890 | Z - OT / UT | 0.200 | -0.200 |
| Z Coordinate | 31.120 | | |
| Diameter | 6.800 | | |
| Thread Pitch | 1.250 | | |
| Left-Handed as Right-Handed Thread | 1 Left ☐ Right ☐ | | |
| External/Internal | 1 External ☐ Internal ☐ | | |
| Start Value | -907.000 | | |
| End Value | -907.000 | | |
| Idling Value | 1.000 | | |
| Start Angle | 0.000 | | |
| End Angle | 360.000 | | |
| Number of Contacts Made by Feeler | 6 | | |
| Nominal Dim. Selection | YZ | | |
| Nominal Dim. Desig. X | | | |
| Nominal Dim. Desig. Y | 108_G04_Y | | |
| Nominal Dim. Desig. Z | 108_G04_Z | | |

Aborted   Finished

CNC PRODUCTION SYSTEM WITH CENTRAL DATABASE AND A WORKPIECE MEASURING METHOD

BACKGROUND OF THE INVENTION

Field of the Invention

The present invention relates to a system and a method for the computer-controlled measurement of workpieces. The system has at least one measuring machine and a device for entering parameters of the workpieces to be produced into a database.

In present-day mechanical engineering, it is essential for high-speed, efficient, low-cost and accurate production or processing of machine components. Such components are produced on numerically controlled machine tools, known as CNC processing machines. The CNC processing machines have a computer based controller, which controls the sequences of movements in the production of individual machine parts and workpieces. The computer based controller thereby issues control commands to electric motors of the processing machine, which uses its tools to process the workpiece to be produced in accordance with the control commands. The workpieces are in this case usually made of steel, but in principle other materials can also be processed in this way. The accuracy requirements for such workpieces can be tremendously high, for example in the production of printing machines it is necessary to measure the workpieces to within an accuracy of thousandths of a millimeter in order to ensure satisfactory running of the printing machine.

For this reason, it is necessary to measure the workpieces produced by a CNC processing machine after every processing operation, in order to ensure that the closest tolerances are maintained. Measuring the workpieces under these high accuracy requirements takes place by measuring machines on which the workpieces to be measured are fixed and are subsequently measured. If the measuring machine finds deviations from the setpoint values that go beyond the permissible tolerances, the workpiece must either be reprocessed or, if this is not possible, segregated out. For controlling the processing operation on a CNC processing machine and for carrying out the measuring operation on a measuring machine, the exact dimensions of the respective workpiece must be known to both devices. In other words, the dimensions of the workpiece must be stored in the control computers of the measuring machine and of the CNC processing machine, with the result that the workpiece can be processed and measured correspondingly.

In the case of present-day measuring machines, it is necessary for each measuring operation to enter the dimensions of the workpiece to be measured into the computer of the measuring machine in order to allow the workpiece to be checked subsequently for conformity with the data entered. Alternatively, a number of measuring operations are entered in advance in the computer of the measuring machine, but can only be changed on the machine. Since each manufacturer of measuring machines provides its own programming systems for its machine, reprogramming has to take place whenever the measuring machine is exchanged. Furthermore, each new measuring operation must be programmed on the associated measuring machine.

SUMMARY OF THE INVENTION

It is accordingly an object of the invention to provide a CNC production system with central database and a workpiece measuring method that overcome the above-mentioned disadvantages of the prior art devices and methods of this general type, which allow easier reprogramming to new processing and measuring operations than in the prior art.

With the foregoing and other objects in view there is provided, in accordance with the invention, a system for measuring workpieces. The system contains at least one measuring machine, a database, a device connected to the database for entering dimensions of the workpieces to be produced as parameters into the database, and a processor connected between the measuring device and the database. The processor generates a measuring program in dependence on the parameters read in from the database.

According to the present invention, the data, i.e. the dimensions, of the workpieces to be produced are stored as parameters in a database. Therefore, the data for a workpiece to be measured no longer have to be programmed into the machine control or the measuring program of the measuring machine, but can be taken directly from the database by the measuring machine before the respective measuring operation that is to be carried out. Consequently, the measuring machine is capable of measuring all workpieces to be produced that have their data stored in the database. All the measuring machines in a production plant can access this database, which makes administration of the complete set of machines much easier. There is now only one central database, in which the data of the workpieces to be produced are stored and which can be accessed by a number of or all the measuring machines, with the result that only this one database or small number of databases has to be maintained. Since the measuring machines may originate from different manufacturers, conversion programs that convert the data from the database into a format suitable for the respective measuring machine run on the control computers of the measuring machines. However, this conversion software only has to be implemented once when a new measuring machine is acquired, with the result that further programming operations on the measuring machine after that are superfluous. Only in this way can the measuring machines be meaningfully linked up with one another, the database serving as a central node. Consequently, parameterized measuring programs that load the data of the workpieces to be measured from the database run on the measuring machines. The measuring program of the measuring machine is consequently set up in a parameterized form, i.e. the dimensions of the workpieces are only inserted as parameters into the measuring program of the measuring machine at the time when the measuring program is running, allowing changes of the dimensions of the workpieces to be made independently of the measuring program and not requiring the measuring program to be recompiled each time the parameters change, as in the case of the prior art.

In a first advantageous refinement of the invention, it is provided that the CNC processing machine has the possibility of accessing the data of workpieces to be produced that are stored in the database. Since the data of all the workpieces to be produced that have to be measured on the measuring machines are expediently stored in the database, it is possible to use these data also for the actual production of the workpieces on the CNC processing machines. This is so because usually only workpieces that have previously been shaped on CNC processing machines are measured, and vice versa. In this way, the advantages of the central programming of measuring machines can also be used for the programming of the CNC processing machines. The CNC processing machines are therefore connected up to the database and can access the data stored in it. For this purpose, a conversion program which converts the data from the database into a format that is compatible with the respective CNC processing machine also runs on the control computers of the CNC processing machines that are connected to the database. The conversion program only has to be programmed in once for each CNC processing machine when it is acquired, making subsequent changes to the control program of the CNC processing machine superfluous. The CNC processing machine reads the data of the workpiece to be produced from the database and controls its tools on the basis of these data.

It is also provided that the database is connected up to a separate computer for entering data for workpieces to be produced. In this way a possibility for maintaining the data of the workpieces to be produced that are stored in the database is created. In this case, the separate computer for entering data does not have to be located in the vicinity of the database, which runs for example on its own server, nor does it have to be located in the vicinity of the CNC processing machines and the measuring machines. It is sufficient for the separate computer to be connected up to the server of the database via a data line. On the separate computer, either the data of the workpieces to be processed can be entered manually in an input mask, or the data can be taken automatically from a CAD program, with the aid of which the data of the workpieces to be produced are prepared on the computer. Also installed in turn on the separate computer is conversion software, which converts the data entered by use of the input mask or the data originating from the CAD program into the format of the database on the server. In this way, it is possible to change the data in the database at a central location via the separate computer without having to intervene in any way in the programs of the control computers of CNC processing machines and measuring machines.

In a further refinement of the invention, it is provided that the CNC processing machine is connected to the separate computer for entering data of workpieces to be produced. In this way it is possible also to transfer data from the separate computer directly to the CNC processing machine without having to read them from the database. In particular, this concerns data that are important only for the processing operations on the CNC processing machines, but are irrelevant for the measuring operations on the measuring machines. These data need not be stored in the global database, but can be passed directly from the separate computer to the respective CNC processing machine.

Furthermore, it is of advantage that the separate computer has a device by which the data of a workpiece to be produced that are generated by a CAD program can be converted into a data format in which the data of the workpiece to be produced can be stored in the database. The data from the CAD program usually have a different data format than the data in the database. For instance, the data in CAD programs are usually in the "Step" format, while the database has the "SQL" format. Moreover, standard amendments, such as for example tolerances conforming to the DIN standard, usually also have to be added from the data of the CAD program. The data prepared in this way are then subsequently converted into the format of the database.

In a particularly advantageous refinement of the invention, it is provided that the measuring machine requests the data or parameters that are required for measuring a workpiece to be produced from the database anew before each measuring operation and reads them in. The data taken from the database for the measuring operation on the measuring machine are consequently brought up to their current state before each measuring operation, with the result that any changes that have been made in the meantime to the data of the workpiece to be measured in the database are taken over immediately into *the measuring program on the measuring machine. This is important in particular whenever a number of workpieces that are actually the same are measured one after the other, with the result that renewed reading in of the data from the database would in fact not be necessary. If, however, data have been changed in the meantime in these series of successive measuring operations, they would not be taken into account if the measuring machine did not access the current data stored in the database before each measuring operation but instead accessed the data in its own buffer memory. With this advantageous refinement of the invention, it is therefore ensured that the measuring machine always operates with current data, which also applies equally well to the CNC processing machines when they obtain their data directly from the database. The CNC processing machines consequently allow themselves always to be kept up to the latest state of the database.

Other features which are considered as characteristic for the invention are set forth in the appended claims.

Although the invention is illustrated and described herein as embodied in a CNC production system with central database and a workpiece measuring method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an illustration of a reduced combination containing a coordinate measuring device, an SQL server with a database and a separate computer for entering the data of workpieces to be produced; and FIG. 3 is an illustration of an input mask for the data of workpieces to be produced for a manual input on a separate computer.

DESCRIPTION OF THE PREFERRED EMBODIMENTS

Figure 1:
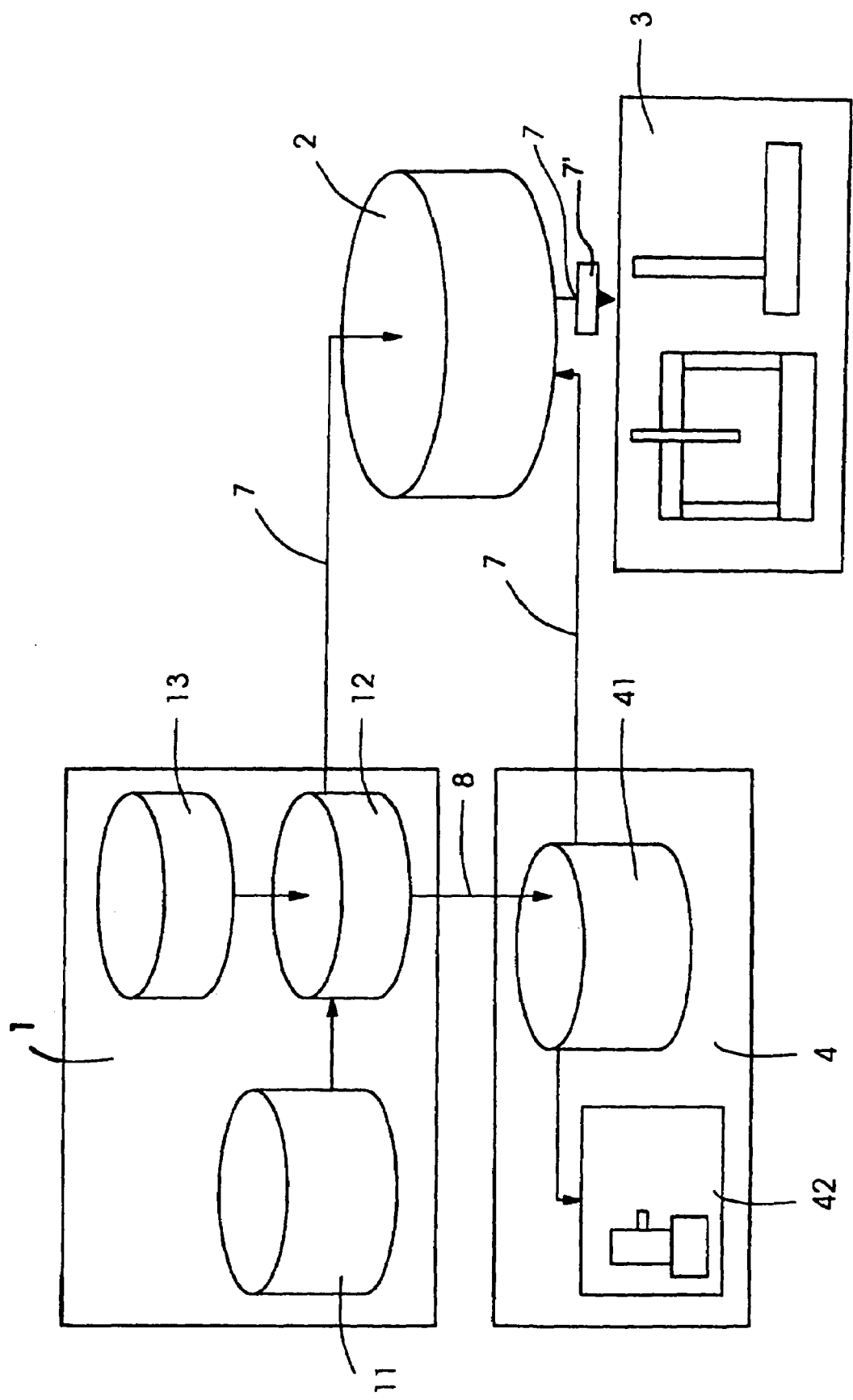
FIG. 1 is an illustration showing a combination of a CNC processing machine two coordinate measuring devices, an SQL server with a database and a separate computer for preparing the data of workpieces to be produced.

Referring now to the figures of the drawing in detail and first, particularly, to FIG. 1 thereof, there is shown a combination of two coordinate measuring devices or machines 3, a server with a global database 2, a CNC processing machine 4 and a separate computer 1. The separate computer 1 is a PC or a notebook, on which a CAD program 11 for designing machines and workpieces is installed. The workpieces configured by the CAD program 11 are in this case in the "Step" data format specific to CAD. Furthermore, on the separate computer 1 there is software 13 which contains so-called standard amendments, with the result that the parameters of workpieces to be produced that are prepared in the CAD program 11 can be supplemented by the standard amendments program 13, for example to add tolerance zones in accordance with the DIN standard. Furthermore a third program 12, that is a program for feature management 12, also runs on the separate computer 1. This program serves for defining processing operations for the CNC processing machine 4. The parameters supplemented in this way from the CAD program 11 are finally converted by conversion software 7, which likewise runs on the separate computer 1, as parameters into the format of the global database on the server 2. The parameters are in this case formatted in the known programming language for databases SQL, the server 2 having a Unix operating system. The operating system of the separate computer 1 is preferably Windows, other systems, such as Linux, also being possible provided that they support the programs 11, 12, 13 running on the computer. The server 2 and the separate computer 1 in this case communicate on either a wire-bound or a wireless basis via a data line.

The coordinate measuring devices 3 also communicate with the server 2 via such a data line, with the result that before each measuring operation they can access the parameters stored on the server 2. In the global database, the dimensions, the tolerances and the measuring strategy of the workpiece to be measured are stored as parameters, with the result that these data, which are necessary for measuring the workpiece, can be read directly from the database on the server 2 by the coordinate measuring devices 3 into their control program. Therefore, no parameters of any workpieces have to be stored in the control program on a control computer of the coordinate measuring devices 3. The control program of the measuring machine 3 is specific to the measuring machine, since each manufacturer has its own peculiarities. Therefore, connected upstream of the measuring machine 3 is a so-called postprocessor 7', which generates and converts the measuring program, which is independent of the measuring machine, into the control program, which is specific to the measuring machine. The postprocessor function can also be done by software and is indicated in FIGS. 1 and 2 as conversion software 7. Only by reading the parameters into the machine-independent measuring program is the suitable measuring strategy for the measuring operation defined in dependence on the parameters read in, and the measuring program and the control program of the measuring machine 3 that is generated from it in the postprocessor 7, 7' prepared in this way by an internal algorithm for the current measuring operation.

In the case of the combination according to FIG. 1, a control computer for the CNC programming system 41 of the CNC processing machine 4 may also revert to the parameters in the database on the server 2. Consequently, the parameters of the control computer of the CNC processing machine 4 also no longer have to be programmed, but instead can be taken over directly from the server 2. For format conversion, conversion software 7, which converts the parameters from the SQL server 2 into the format that is customary for CNC machines, likewise runs on the computer of the CNC processing machine 4 along with the CNC programming system 41. With these parameters, the CNC programming system 41 running on the control computer of the CNC processing machine 4 can then control the motors of the actual processing machine 42 in such a way that the tools of the processing machine 42 produce the workpiece that is to be produced in accordance with the parameters from the database on the SQL server 2. Furthermore, the CNC processing machine 4 also has a data link 8 to the separate computer 1, with the result that parameters which are only required for the CNC processing machine 4 can also be transferred directly from the separate computer 1 to the machine.

FIG. 2 shows a combination of two coordinate measuring devices 3, which are connected up to the server 2 with the global database, the server 2 being connected up in turn to a separate PC 5 via a data link. The separate PC 5 is in principle the same computer as the separate computer 1 in FIG. 1, without any necessity for the PC 5 according to FIG. 2 to have a CAD program. The computer 5 may also only have an input mask 6 (FIG. 3), by which the data or parameters for a workpiece to be produced can be entered manually by an operator. The manually entered data or parameters are then likewise stored in the database on the server 2 and are then available for measuring operations on the coordinate measuring devices 3. It goes without saying that this manual input can also take place by the input mask 6 on the CAD computer 1 in FIG. 1, with the result that the combination in FIG. 1 can be programmed both automatically by the CAD program and manually by the input mask 6. What is decisive in each of FIGS. 1 and 2 is that it is only necessary for the parameters to be entered on one computer 1, 5, with the result that the programming of individual coordinate measuring devices 3 is superfluous, since the machines 3 read the parameters into their control programs from the database 2 at the time when their control programs are running. When there are changes of parameters, the control programs themselves are no longer changed and also not recompiled, which represents a not inconsiderable time saving.

FIG. 3 shows an example of the input mask 6. The operator can use the input mask 6 to enter the dimensions of a workpiece to be produced and at the same time define the measuring strategy or processing strategy. In the input mask 6 according to FIG. 3, the parameters are for a threaded hole in a workpiece. By use of the parameters entered there, the position of the threaded hole is defined on the basis of XYZ Cartesian coordinates, as well as its diameter, its thread pitch and the way in which the threaded hole is made in the workpiece. When all the required data have been provided by the input mask 6, the threaded hole is provided with a feature number and stored in the database on the server 2. A number of operations can be stored for each workpiece under feature numbers, features that are the same for a number of workpieces only having to be stored once under a common feature number. This minimizes the input of parameters for workpieces to be produced. When reading out the data of the workpiece from the database 2 into a computer connected upstream of the measuring machine 3, a measuring program is prepared on the computer in dependence on the data read out. The measuring program is then converted by the conversion software 7 into a control program of the measuring machine 3, with the result that the measuring machine 3 can perform the corresponding measuring operations. In this case, the control program always reads the latest parameters from the database 2.

This application claims the priority, under 35 U.S.C. § 119, of German patent application No. 103 44 418.1, filed Sep. 25, 2003; the entire disclosure of the prior application is herewith incorporated by reference.

I claim:

1. A system for measuring workpieces, comprising:
   at least one measuring machine;
   a database;
   a device connected to said database for entering dimensions of the workpieces to be produced as parameters into said database; and
   a post-processor connected between said measuring machine and said database, said post-processor generating a measuring program in dependence on the parameters read in from said database said measuring machine reading the parameters into a control program while said control program is running, said post-processor converting said measuring program into said control program.

2. The system according to claim 1, wherein said control program is a machine-dependent control program of said measuring machine.

3. The system according to claim 1, wherein said device is a separate computer for entering the parameters for the workpieces to be produced, and said database is connected to said separate computer.

4. The system according to claim 3, wherein said separate computer is loaded with a CAD program by which the parameters of a workpiece to be produced are generated, and said separate computer having a further device for converting the parameters to a data format that can be stored in said database.

5. A method for measuring workpieces, which comprises the steps of:
   providing at least one measuring machine and a device entering dimensions of the workpieces to be produced as parameters into a database;
   generating a measuring program using a post-processor in dependence on the parameters to be read in from the database;
   reading the parameters into a control program with the measuring machine while the control program is running, wherein a post-processor converting the measuring program into the control program; and
   outputting the dimensions of the workpieces to a user.

6. The method according to claim 5, wherein the control program is a machine-dependent control program of the measuring machine.

7. The method according to claim 6, which further comprises:
   storing the dimensions of the workpieces to be produced as the parameters in the database separately from the measuring program and a control program of the measuring machine; and
   reading the parameters of a workpiece to be measured on the measuring machine into the control program of the measuring machine from the database for a measuring operation on the measuring machine.

8. The method according to claim 5, which further comprises preparing the parameters of a workpiece to be produced using a separate computer.

9. The method according to claim 8, which further comprises;
   preparing the parameters of the workpiece to be produced on the separate computer using a CAD program;
   converting the parameters prepared into a format suitable for the database; and
   storing the parameters in the format in the database.

10. The method according to claim 9, wherein a control program of the measuring machine requests the parameters that are required for measuring the workpiece to be produced from the database anew before each measuring operation and reads them in.

* * * * *